(12) United States Patent
Goto et al.

(10) Patent No.: US 10,562,490 B2
(45) Date of Patent: Feb. 18, 2020

(54) OCCUPANT RESTRAINING DEVICE FOR VEHICLE

(71) Applicant: TOYOTA JIDOSHA KABUSHIKI KAISHA, Toyota-shi (JP)

(72) Inventors: Mitsuaki Goto, Nagoya (JP); Takashi Hasegawa, Ashigarakami-gun (JP); Katsunori Yamada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 57 days.

(21) Appl. No.: 15/726,436

(22) Filed: Oct. 6, 2017

(65) Prior Publication Data
US 2018/0105136 A1 Apr. 19, 2018

(30) Foreign Application Priority Data
Oct. 13, 2016 (JP) .................................. 2016-201828

(51) Int. Cl.
*B60R 22/46* (2006.01)
*B60R 21/0134* (2006.01)
*B60R 21/013* (2006.01)

(52) U.S. Cl.
CPC ............ *B60R 22/46* (2013.01); *B60R 21/013* (2013.01); *B60R 21/0134* (2013.01);
(Continued)

(58) Field of Classification Search
CPC . B60R 22/46; B60R 21/0134; B60R 22/4628; B60R 2021/0004; B60R 2021/01272; B60R 21/01
See application file for complete search history.

(56) References Cited

U.S. PATENT DOCUMENTS

| 5,186,494 A | 2/1993 | Shimose | |
|---|---|---|---|
| 6,485,057 B1 * | 11/2002 | Midorikawa | ........... B60R 21/01 280/801.1 |

(Continued)

FOREIGN PATENT DOCUMENTS

| EP | 1 415 872 A1 | 5/2004 |
|---|---|---|
| JP | 2001-239922 A | 9/2001 |

(Continued)

OTHER PUBLICATIONS

Office Action dated May 16, 2019 in co-pending U.S. Appl. No. 15/836,984, 10 pages.

(Continued)

*Primary Examiner* — Karen Beck
(74) *Attorney, Agent, or Firm* — Oblon, McClelland, Maier & Neustadt, L.L.P.

(57) ABSTRACT

The occupant restraining device for a vehicle has a seatbelt, a collision predicting sensor, a braking device that enlarges a gap between a vehicle occupant and a seatback of a vehicle seat, an explosive-type pretensioner and electric motor that retract the seatbelt, and a control section that, in a case in which a front collision of the vehicle is sensed in advance by the collision predicting sensor, enlarges the gap between the vehicle occupant and the seatback by the braking device and starts retracting of the seatbelt by the explosive-type pretensioner and the electric motor, and at least until forward movement of the vehicle occupant starts after occurrence of the front collision, continues to input load to the vehicle occupant from the seatbelt and continues to move the vehicle occupant toward a vehicle rear side.

6 Claims, 13 Drawing Sheets

(52) U.S. Cl.
CPC . *B60R 22/4628* (2013.01); *B60R 2021/01311* (2013.01); *B60R 2022/4666* (2013.01)

(56) References Cited

U.S. PATENT DOCUMENTS

| | | | |
|---|---|---|---|
| 7,686,118 B2 | 3/2010 | Akaba et al. | |
| 8,157,045 B2* | 4/2012 | Hashimoto | B60N 2/0232 180/268 |
| 9,076,045 B2 | 7/2015 | Atsmon et al. | |
| 9,443,152 B2 | 9/2016 | Atsmon et al. | |
| 2003/0030264 A1 | 2/2003 | Motozawa | |
| 2004/0084890 A1* | 5/2004 | Tobata | B60R 21/013 280/806 |
| 2005/0252710 A1* | 11/2005 | Akaba | B60R 21/013 180/268 |
| 2006/0237960 A1 | 10/2006 | Kudo et al. | |
| 2011/0074190 A1* | 3/2011 | Hashimoto | B60N 2/0276 297/216.1 |
| 2017/0274854 A1* | 9/2017 | Nagasawa | B60R 21/01 |
| 2018/0009403 A1 | 1/2018 | Yamazaki et al. | |
| 2018/0105136 A1 | 4/2018 | Goto et al. | |
| 2018/0222425 A1* | 8/2018 | Hasegawa | B60R 21/0134 |
| 2018/0297553 A1* | 10/2018 | Takamatsu | B60R 22/46 |

FOREIGN PATENT DOCUMENTS

| | | |
|---|---|---|
| JP | 2003-025889 | 1/2003 |
| JP | 2003-025955 | 1/2003 |
| JP | 2003-182519 | 7/2003 |
| JP | 2004-262256 A | 9/2004 |
| JP | 2004-262259 | 9/2004 |
| JP | 2005-263071 A | 9/2005 |
| JP | 2006-175901 | 7/2006 |
| JP | 2006-281978 A | 10/2006 |
| JP | 2006-290258 A | 10/2006 |
| JP | 2006-298105 A | 11/2006 |
| JP | 2006-327413 | 12/2006 |
| JP | 2017-1445 A | 1/2017 |

OTHER PUBLICATIONS

U.S. Office Action issued in U.S. Appl. No. 15/836,984 dated Nov. 14, 2019.

* cited by examiner

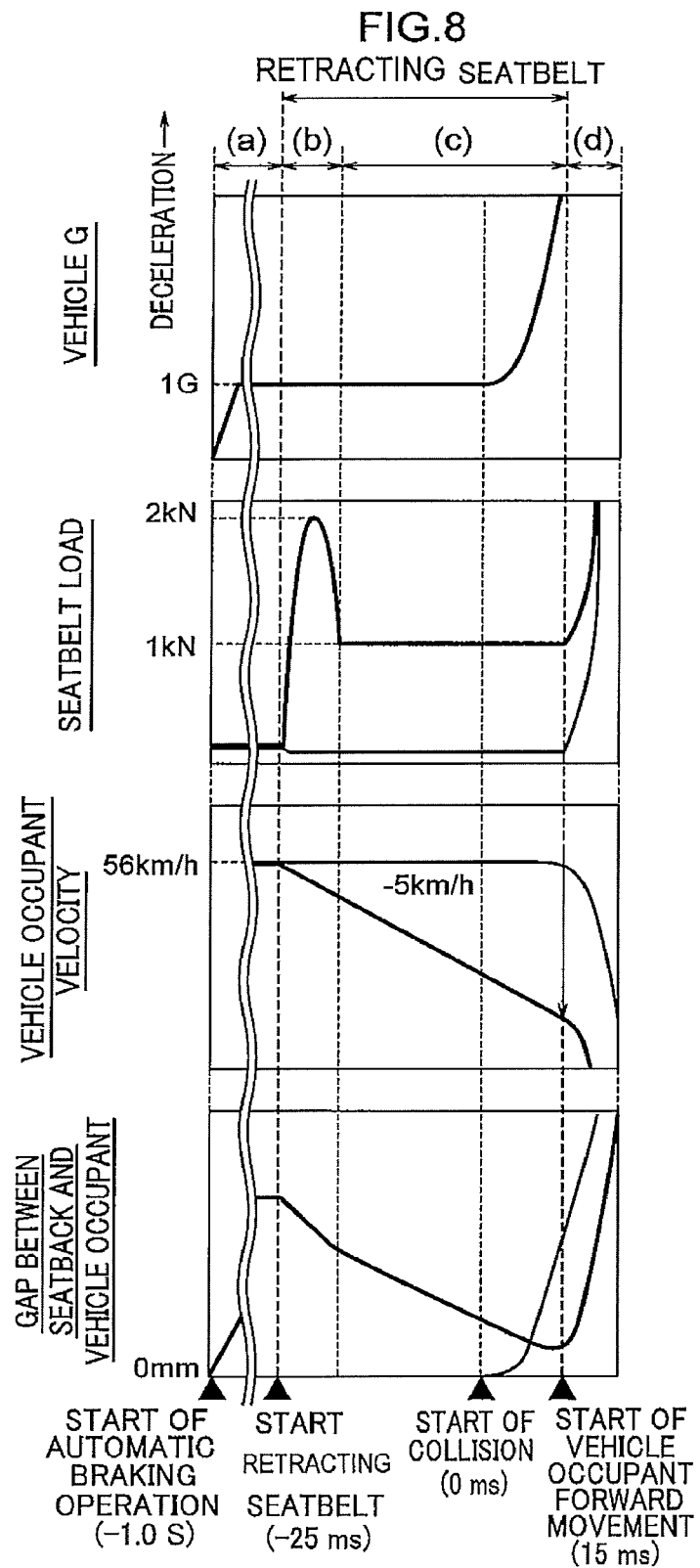

CHEST FLEXURE

KINETIC ENERGY OF VEHICLE OCCUPANT

OCCUPANT RESTRAINING DEVICE FOR VEHICLE

CROSS-REFERENCE TO RELATED APPLICATION

This application claims priority under 35 USC 119 from Japanese Patent Application No. 2016-201828, filed on Oct. 13, 2016, the disclosure of which is incorporated by reference herein.

BACKGROUND

Technical Field

The present disclosure relates to an occupant restraining device for a vehicle.

Related Art

As a vehicle occupant protecting device, a structure has been disclosed in which, in a case in which a front collision of a vehicle is sensed in advance, a seat moving mechanism and a seatbelt take-up mechanism are controlled interlockingly, and, after the seatbelt is taken-up, the seat is tilted rearward so as to enlarge the distance between the vehicle occupant and the steering wheel as compared with a usual state (refer to Japanese Patent Application Laid-Open (JP-A) No. 2006-175901).

Further, as a vehicle occupant protecting device, there has been disclosed a structure in which, by controlling the strength of restraining of a vehicle occupant by a seatbelt after a vehicle collision, a vehicle body deceleration waveform that reduces the deceleration of the vehicle occupant appropriately is realized, and a reduction in the injury value of the vehicle occupant is made possible (refer to JP-A No 2003-25955).

However, even in a case in which the distance between the vehicle occupant and the steering wheel is increased at the time of advance sensing of a collision as in above-described JP-A No. 2006-175901, in a case in which the vehicle collision velocity or the vehicle occupant mass or the like is large and the kinetic energy of the vehicle occupant is large, there is the possibility that the energy absorption will be insufficient.

Further, even if the strength of restraining a vehicle occupant by a seatbelt after a collision is controlled as in above-described JP-A No. 2003-25955, in a case in which the kinetic energy of the vehicle occupant is large, there is the possibility that the energy absorption will be insufficient.

SUMMARY

The present disclosure provides an occupant restraining device for a vehicle that may improve the vehicle occupant protecting performance at the time of a front collision of a vehicle.

A first aspect of the present disclosure is an occupant restraining device for a vehicle, including: a seatbelt structured so as to be able to be retracted at the vehicle, and positioned at a chest region of a vehicle occupant when seated in a vehicle seat; a collision predicting sensor configured to sense, in advance, a front collision of the vehicle; a gap enlarging section configured to enlarge a gap between the vehicle occupant and a seatback of the vehicle seat; an actuator configured to retract the seatbelt; and a control section configured to, in a case in which a front collision of the vehicle is sensed in advance by the collision predicting sensor, enlarge the gap between the vehicle occupant and the seatback by the gap enlarging section, and start retracting of the seatbelt by the actuator, and, from before the front collision at least until forward movement of the vehicle occupant starts after occurrence of the front collision, continue to input load from the seatbelt to the vehicle occupant and continue to move the vehicle occupant toward a vehicle rear side.

Note that "front collision" is not limited to a full overlap collision between vehicles, and includes various forms of collisions that can arise in the direction in which the vehicle advances, such as a small overlap collision, an oblique collision, and the like.

In the occupant restraining device for a vehicle of the first aspect, in a case in which a front collision of the vehicle is sensed in advance by the collision predicting sensor, the control section operates the gap enlarging section, and enlarges the gap between the vehicle occupant and the seatback. Next, due to the control section operating the actuator, retracting of the seatbelt starts. Due thereto, from before a front collision of the vehicle occurs until forward movement of the vehicle occupant starts (the initial stage of the collision) after the front collision has occurred, the occupant restraining device for a vehicle of the first aspect continues to input load from the seatbelt to the vehicle occupant, and continues to move the vehicle occupant rearward.

Namely, at the time when a front collision of the vehicle is predicted, the occupant restraining device for a vehicle of the first aspect enlarges the gap between the vehicle occupant and the seatback, and, from before a front collision of the vehicle occurs through the initial stage of the collision, the occupant restraining device for a vehicle continues to move the vehicle occupant toward the vehicle rear side while pressing the vehicle occupant by the seatbelt. Accordingly, in the occupant restraining device for a vehicle of the first aspect, the decelerated state, in which the ground speed of the vehicle occupant is slower than the ground speed of the vehicle, is maintained until the initial stage of the collision. Due thereto, in the occupant restraining device for a vehicle of the first aspect, the initial kinetic energy that is due to deceleration of the vehicle occupant is reduced, and the energy that is to be absorbed at the time of restraining the vehicle occupant may be reduced.

In a second aspect of the present disclosure, in the first aspect, the actuator may include an explosive-type pretensioner and an electric motor; and the control section may operate the explosive-type pretensioner before a front collision of the vehicle, and, from before the front collision at least until forward movement of the vehicle occupant starts, may drive the electric motor.

In the occupant restraining device for a vehicle of the second aspect, the retracting of the seatbelt in a case in which a front collision of the vehicle is sensed in advance is carried out by using the explosive-type pretensioner and the electric motor. By retracting the seatbelt rapidly by the explosive-type pretensioner, deceleration of the vehicle occupant before the front collision can be made to be large. Further, from before the occurrence of a front collision at least until forward movement of the vehicle occupant starts after the occurrence of the front collision, the electric motor is driven, the seatbelt is retracted, and the vehicle occupant is continued to be moved toward the vehicle rear side. Accordingly, in the occupant restraining device for a vehicle of the second aspect, when forward movement of the vehicle occupant starts after the occurrence of a front collision, the vehicle occupant is already restrained by the seatbelt.

In a third aspect of the present disclosure, in the second aspect, the load may be set to become a maximum at a time of operation of the explosive-type pretensioner.

In the occupant restraining device for a vehicle of the third aspect, the load that is inputted from the seatbelt to the vehicle occupant becomes a maximum at time of operation of the explosive-type pretensioner that operates before a front collision occurs. Accordingly, in the occupant restraining device for a vehicle of the third aspect, the deceleration of the vehicle occupant before the occurrence of a front collision may be made to be even greater.

In a fourth aspect of the present disclosure, in the above-described aspects, the actuator may be an electric motor; and before a front collision of the vehicle occurs, the control section may drive the electric motor at a first velocity, and, thereafter, from before the front collision occurs at least until forward movement of the vehicle occupant starts, may drive the electric motor at a second velocity that is slower than the first velocity.

In the occupant restraining device for a vehicle of the fourth aspect, the retracting of the seatbelt in a case in which a front collision of the vehicle is sensed in advance is carried out by using the electric motor. There are a first velocity, and a second velocity that is slower than the first velocity, as the driving velocities of the electric motor by the control section. Before a front collision of the vehicle occurs, first, the electric motor is driven at the relatively fast first velocity, and the seatbelt is retracted. Due thereto, the deceleration of the vehicle occupant before a front collision can be made to be large. Further, thereafter, from before the occurrence of the front collision at least until forward movement of the vehicle occupant starts after the occurrence of the front collision, the electric motor is driven at the second velocity, the seatbelt is retracted, and the vehicle occupant is continued to be moved toward the vehicle rear side. Accordingly, when the forward movement of the vehicle occupant starts after a front collision occurs, the vehicle occupant is already being restrained by the seatbelt. Due thereto, the occupant restraining device for a vehicle of the fourth aspect may reduce the initial kinetic energy that is due to deceleration of the vehicle occupant, and may reduce the energy that is to be absorbed at the time of restraining the vehicle occupant.

In a fifth aspect of the present disclosure, in the above-described aspects, the gap enlarging section may be at least one of a braking device that decelerates the vehicle and tilts the vehicle occupant forward by inertia, a reclining device that tilts the seatback rearward, or a seat sliding device that moves the vehicle seat toward the vehicle rear side.

In the occupant restraining device for a vehicle of the fifth aspect, a mechanism that tilts the seatback rearward, a mechanism that moves the vehicle seat toward the vehicle rear side, or an automatic braking device is used as the gap enlarging section. Until forward movement of the vehicle occupant starts after the occurrence of a front collision of the vehicle, the gap between the vehicle occupant and the seatback can be enlarged by tilting the seatback rearward or by moving the vehicle seat toward the vehicle rear side. Further, by applying braking force to the vehicle by an automatic braking device, the chest region of the vehicle occupant who is seated in a vehicle seat can be tilted forward by inertia, and the gap between the vehicle occupant and the seatback can be enlarged. In this way, by using various types of gap enlarging sections, the occupant restraining device for a vehicle of the fifth aspect can enlarge the region over which the chest region of the vehicle occupant can move toward the vehicle rear side.

In accordance with the occupant restraining device for a vehicle of the first aspect of the present disclosure, the vehicle occupant protecting performance at the time of a front collision of the vehicle may be improved.

In accordance with the occupant restraining devices for a vehicle of the second and fourth aspects of the present disclosure, the initial kinetic energy of the vehicle occupant may be reduced more.

In accordance with the occupant restraining device for a vehicle of the third aspect of the present disclosure, the initial kinetic energy of the vehicle occupant may be reduced even more.

In accordance with the occupant restraining device for a vehicle of the fifth aspect of the present disclosure, by using various types of gap enlarging sections, the decelerated state of the vehicle occupant due to retracting of the seatbelt may be maintained until the initial stage of the collision.

BRIEF DESCRIPTION OF THE DRAWINGS

Exemplary embodiments will be described in detail based on the following figures, wherein:

FIG. 8 is a graph showing changes in vehicle changes in the seatbelt load, changes in vehicle occupant velocity, and changes in a gap between a seatback and the vehicle occupant, during the time from the start of the automatic braking operation to forward movement of the vehicle occupant;

DETAILED DESCRIPTION

Figure 1:
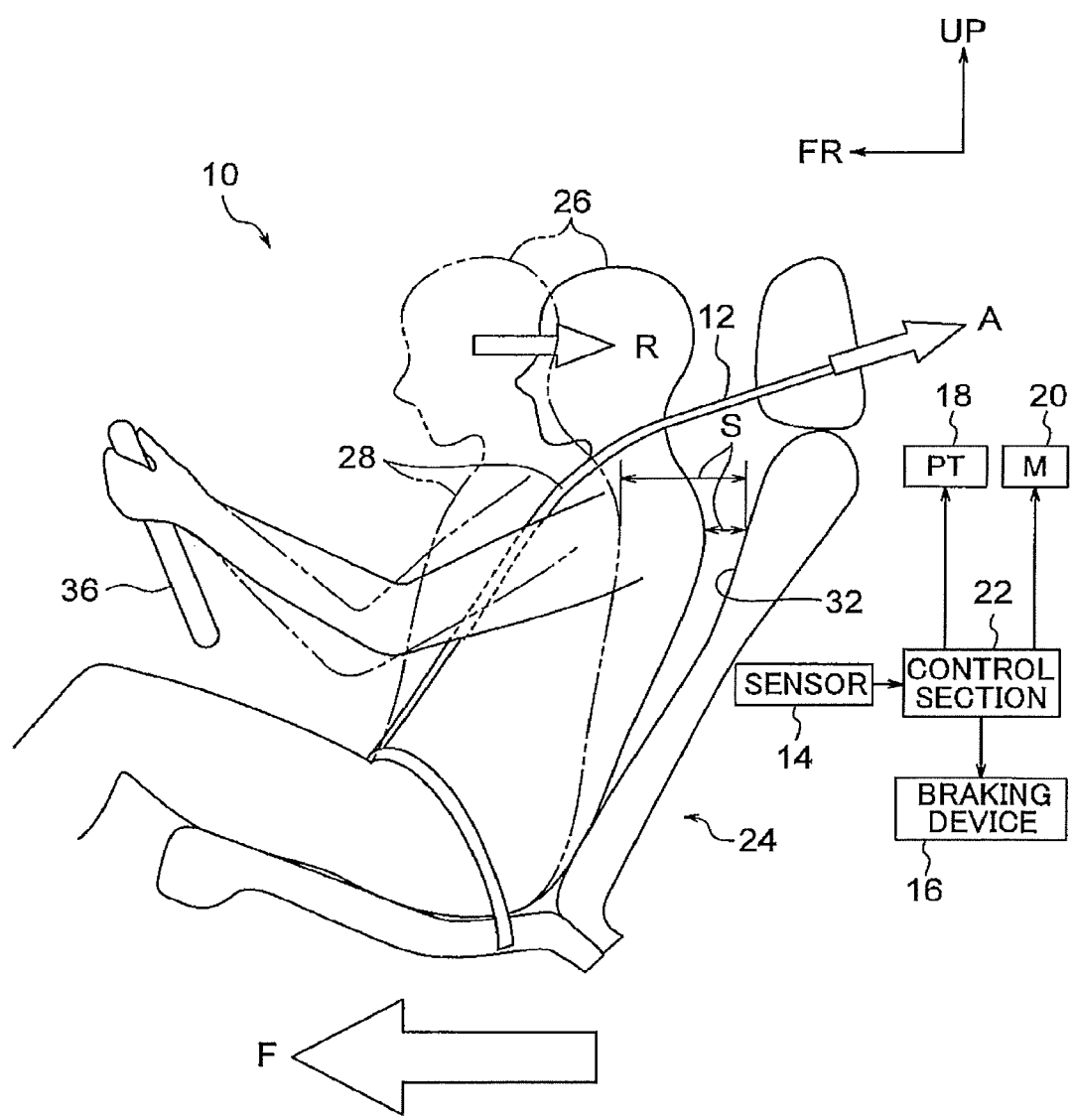
FIG. 1 is a side view and a block drawing schematically showing an occupant restraining device for a vehicle relating to a present exemplary embodiment.

Forms for implementing the present disclosure are described hereinafter on the basis of the drawings. In the drawings, arrow FR indicates the vehicle forward side, and arrow UP indicates the vehicle upward side.

In FIG. 1, an occupant restraining device 10 for a vehicle relating to the present exemplary embodiment has a seatbelt 12, a collision predicting sensor 14, a braking device 16 that serves as an example of a gap enlarging section, an explosive-type pretensioner (PT) 18 and an electric motor (M) 20 that serve as examples of an actuator, and a control section 22.

The seatbelt 12 is a webbing for restraining a vehicle occupant that is structured so as to be able to be retracted at the vehicle, and is non-extensible, and is positioned at a chest region 28 of a vehicle occupant 26 who is seated in a vehicle seat 24. The seatbelt 12 is structured such that, by being taken-up by an unillustrated retractor, the seatbelt 12 can be retracted the arrow A direction. In FIG. 1, the vehicle seat 24 is the driver's seat, and a steering wheel 36 is provided at the vehicle front side of the vehicle seat 24. An airbag 34 (FIG. 7B) that serves as a vehicle occupant restraining device is housed in the steering wheel 36.

The collision predicting sensor 14 senses, in advance, a front collision of an own vehicle 30 (FIG. 3A) that serves as an example of a vehicle. Any of various types of sensors such as a camera, millimeter wave radar, infrared laser, or the like can be used as the collision predicting sensor 14.

The braking device 16 enlarges a gap S between the vehicle occupant 26 and a seatback 32 by decelerating the vehicle and tilting the vehicle occupant 26 forward by inertia. This braking device 16 operates automatically due to a signal from the control section 22 at the time when a front collision is predicted, i.e., has an automatic braking function. At usual times, the braking device 16 is operated by operation of the vehicle occupant 26. It is desirable that the braking device 16 operate as early as possible before a front collision, in order to increase the deceleration of the vehicle and decrease the kinetic energy.

The explosive-type pretensioner 18 and the electric motor 20 are driving portions that retract the seatbelt 12, and are provided, for example, at a retractor (not illustrated) that is for taking-up the seatbelt 12. At the explosive-type pretensioner 18, an explosive is ignited by a signal from the control section 22, and, by utilizing the pressure of the gas that is generated due to this explosive combusting, the seatbelt 12 is retracted in the arrow A direction. Further, the electric motor 20 operates the retractor in the take-up direction by a signal from the control section 22, and retract the seatbelt 12 in the arrow A direction.

In a case in which a front collision of the vehicle is sensed in advance by the collision predicting sensor 14, the control section 22 enlarges the gap S between the vehicle occupant 26 and the seatback 32 by the braking device 16, and starts retracting of the seatbelt 12 by the explosive-type pretensioner 18 and the electric motor 20. Then, from before a front collision at least until forward movement of the vehicle occupant 26 starts after the front collision occurs, the control device 22 continues to input load from the seatbelt 12 to the vehicle occupant 26 and continues to move the vehicle occupant 26 toward the vehicle rear side. Note that there are cases in which this load is called the "seatbelt load".

Figure 2:
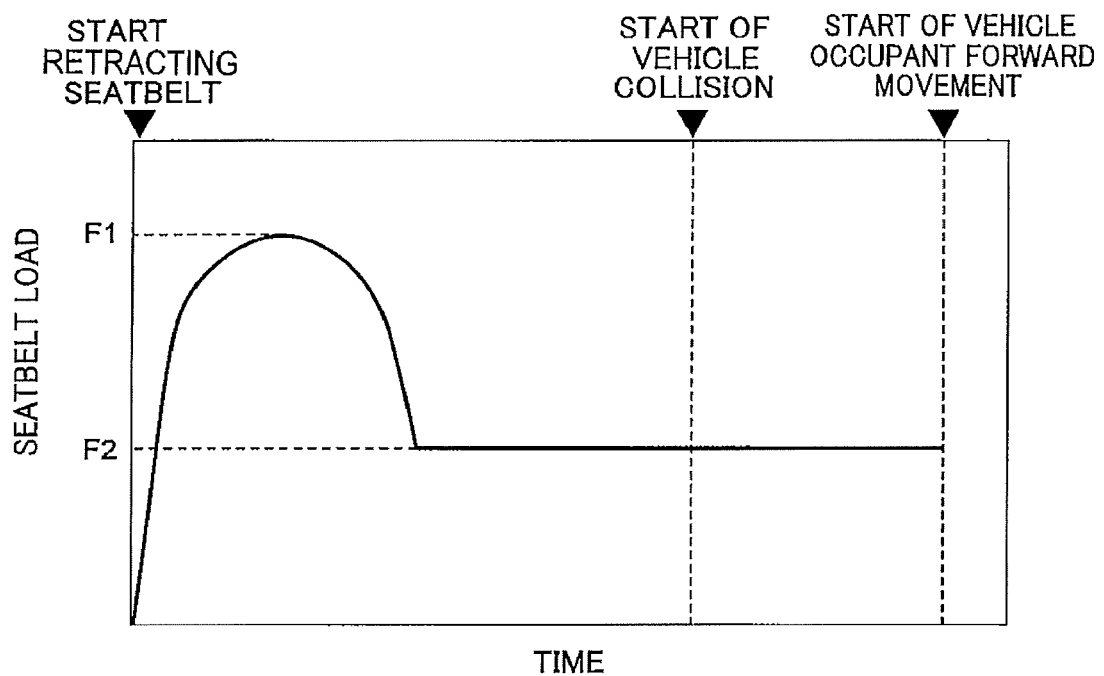
FIG. 2 is a graph showing changes in seatbelt load during a time from the start of retracting of a seatbelt to the start of forward movement of a vehicle occupant.

The control section 22 operates the explosive-type pretensioner 18 before a front collision of the vehicle, and drives the electric motor 20 from before the front collision at least until forward movement of the vehicle occupant 26 starts. Further, the seatbelt load that is inputted from the seatbelt 12 to the vehicle occupant 26 is set so as to become a maximum (F1) at the time of operation of the explosive-type pretensioner 18. In a case in which operation signals are outputted from the control section 22 simultaneously to the explosive-type pretensioner 18 and the electric motor 20, due to the difference in responsiveness, the explosive-type pretensioner 18 starts to retract the seatbelt 12 in earlier than the electric motor 20. Accordingly, as shown in FIG. 2, first, the seatbelt load increases rapidly due to the explosive-type pretensioner 18, and reaches F1 that is the maximum load, and, at the time when the seatbelt load decreases to F2 due to ending of combustion of the explosive, retracting of the seatbelt 12 by the electric motor 20 starts. The electric motor 20 continues to operate from before the occurrence of a front collision at least until forward movement of the vehicle occupant 26 starts after the occurrence of the front collision, and maintains the seatbelt load at F2. Further, due to control of the control section 22, the electric motor 20 stops after the occurrence of the front collision. Note that an operation signal may be outputted from the control section 22 to the electric motor 20 after an operation signal is outputted from the control section 22 to the explosive-type pretensioner 18.

In consideration of cases in which the vehicle occupant 26 is an elderly person whose resistance of the chest region 28 is low, it is desirable that the load F1 is less than or equal to 2 kN. Further, if the seatbelt load is too small, the vehicle occupant 26 will not decelerate, and therefore, it is desirable that the seatbelt load is, for example, greater than or equal to 500 N.

At the time when the vehicle occupant 26 is moved toward the vehicle rear side by the seatbelt 12, it is desirable to make it such that the seatbelt 12 does not become slack, and for the seatbelt 12 to maintain the vehicle occupant 26 in a restrained state. The load F2 is a load that is appropriate for maintaining this restrained state. In a case in which deceleration of the vehicle occupant 26 with respect to velocity F (FIG. 1) of the vehicle at the time when forward movement of the vehicle occupant 26 starts after a front collision is 5 km/h, the load F2 is 1 kN for example. Deceleration of the vehicle occupant 26 is rearward movement velocity R of the chest region 28 that is shown in FIG. 1, and corresponds to "velocity F of vehicle—forwardly advancing velocity of chest region".

The forwardly advancing velocity of the chest region 28 of the vehicle occupant 26 decreases the more that time passes from the start of the retracting of the seatbelt 12.

Therefore, from this standpoint, it is better to start the retracting of the seatbelt 12 earlier. On the other hand, if the gap S between the vehicle occupant 26 and the seatback 32 disappears at the time of movement of the vehicle occupant 26 toward the vehicle rear side, the velocity of the vehicle occupant 26 and the velocity of the vehicle will coincide, and the deceleration will be cancelled. Therefore, from this standpoint, it is better to start the retracting of the seatbelt 12 later. The time of the start of retracting of the seatbelt 12 is set while comparing these circumstances.

The present exemplary embodiment is structured as described above, and operation thereof is as follows. In FIG. 1, at the occupant restraining device 10 for a vehicle relating to the present exemplary embodiment, in a case in which a front collision of the vehicle is sensed in advance by the collision predicting sensor 14, the control section 22 operates the braking device 16 that serves as an example of the gap enlarging section, and enlarges the gap S between the vehicle occupant 26 and the seatback 32. Then, due to the control section 22 operating the explosive-type pretensioner 18 and the electric motor 20, retracting of the seatbelt 12 is started.

Concretely, due to the seatbelt 12 being retracted rapidly by the explosive-type pretensioner 18, the deceleration of the vehicle occupant 26 before a front collision can be made to be large. In particular, as shown in FIG. 2, by making the seatbelt load become the maximum (F1) at the time of operation of the explosive-type pretensioner 18 that operates before a front collision occurs, the deceleration of the vehicle occupant 26 before a front collision occurs can be made to be even larger. Further, from before a front collision occurs at least until forward movement of the vehicle occupant 26 starts after the front collision occurs, the electric motor 20 is driven, the seatbelt 12 is retracted, and the vehicle occupant 26 is continued to be moved toward the vehicle rear side.

Namely, in a case in which a front collision of the vehicle is sensed, the gap S between the vehicle occupant 26 and the seatback 32 is enlarged, and, from before the front collision of the vehicle occurs through the initial stage of the collision, the seatbelt load continues to be inputted from the seatbelt 12 to the vehicle occupant 26, and the vehicle occupant 26 continues to be moved toward the vehicle rear side. In other words, the vehicle occupant 26 does not contact the seatback 32 from the time that the vehicle occupant 26 temporarily tilts forward until the time that forward movement of the vehicle occupant 26 starts (the initial stage of the collision) after the front collision occurs. Accordingly, the decelerated state, in which the ground speed of the vehicle occupant 26 is slower than the ground speed of the vehicle, is maintained until the initial stage of the collision. Further, when forward movement of the vehicle occupant 26 starts after a front collision occurs, the vehicle occupant 26 is already being restrained by the seatbelt 12. Due thereto, the initial kinetic energy is reduced due to deceleration of the vehicle occupant 26, and the energy that is to be absorbed at the time of restraining the vehicle occupant 26 may be reduced.

In this way, in accordance with the present exemplary embodiment, the performance of protecting a vehicle occupant at the time of a front collision of the vehicle may be improved.

The contents of a computer simulation for the present exemplary embodiment, and the results thereof, are described hereinafter. This presupposes a case in which the own vehicle 30 at 56 km/h and the oncoming vehicle 40 at 56 km/h front-collide, while the own vehicle 30 is in the midst of the automatic braking operation. For the vehicle occupant 26, it is assumed that an average male is seated in the driver's seat.

Figure 3A:
FIG. 3A is a drawing showing a state in which a front collision between an own vehicle and an oncoming vehicle is predicted.
Figure 3B:
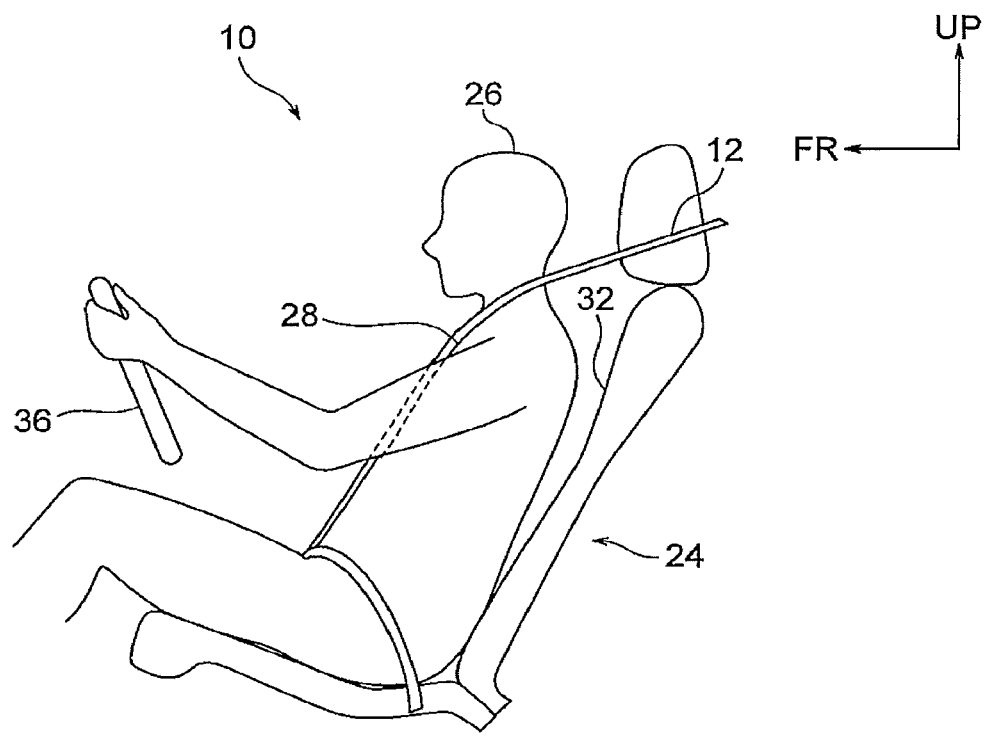
FIG. 3B is a side view showing that the vehicle occupant is in a usual seated state at the time of FIG. 3A.

FIG. 3A and FIG. 3B show a state in which a front collision is predicted by sensing the oncoming vehicle 40 which is an obstacle. At this time, the velocity of the own vehicle 30 is 76 km/h, and the velocity of the oncoming vehicle 40 is 56 km/h. The automatic brake starts operating due to the predicting of a front collision. The vehicle occupant 26 is in a usual seated state, and the vehicle occupant velocity is 76 km/h, which is the same as the velocity of the own vehicle 30.

Figure 4A:
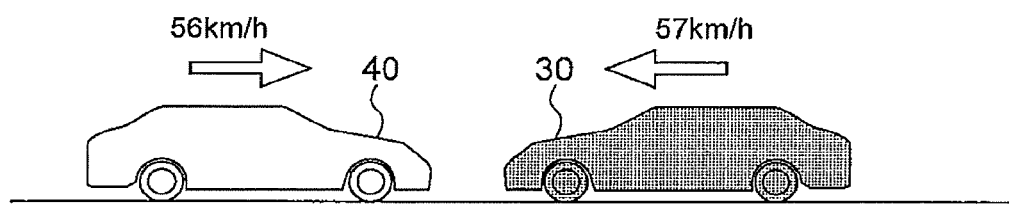
FIG. 4A is a drawing showing a state in which the own vehicle is decelerating by automatic braking operation.
Figure 4B:
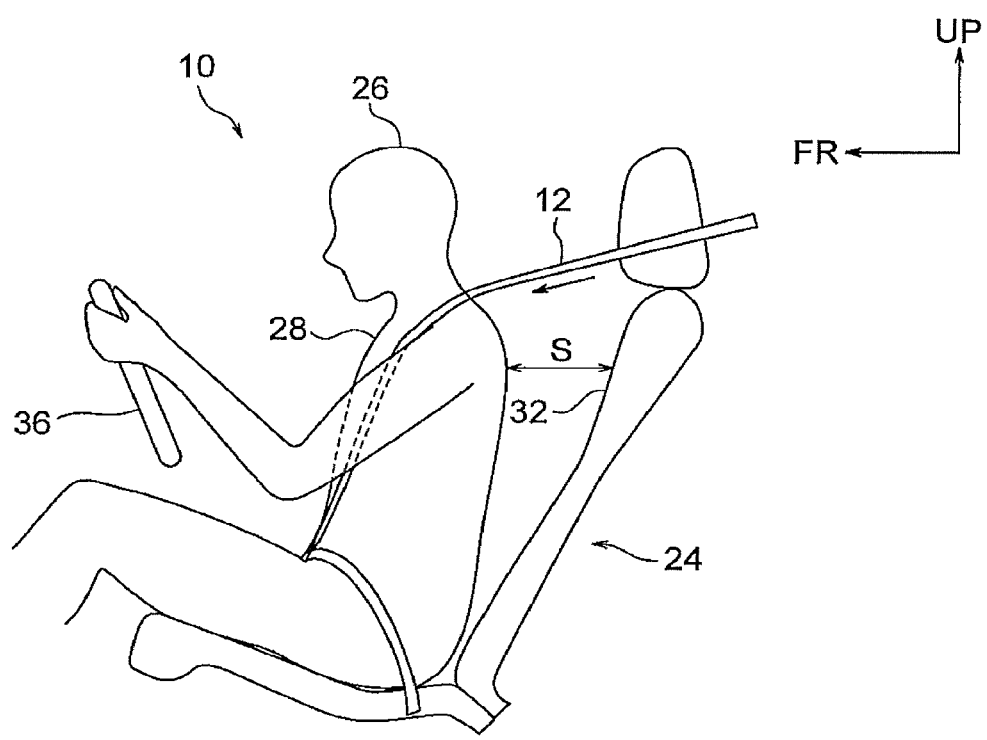
FIG. 4B is a side view showing that the vehicle occupant is tilting forward due to inertia at the time of FIG. 4A.

FIG. 4A and FIG. 4B show a state in which the velocity of the own vehicle 30 has decelerated to 57 km/h by the operation of the automatic brake. The chest region 28 of the vehicle occupant 26 tilts forward due to inertia that arises due to deceleration G of the own vehicle 30, and the gap S between the vehicle occupant 26 and the seatback 32 enlarges. At this time, the seatbelt 12 is pulled-out by a retractor (not illustrated). However, if the pull-out acceleration is greater than a predetermined value, pulling-out of the seatbelt is locked, and further pulling-out is suppressed unless a belt force limiter (described later) operates. The vehicle occupant velocity is 57 km/h, which is the same as the velocity of the own vehicle 30.

Figure 5A:
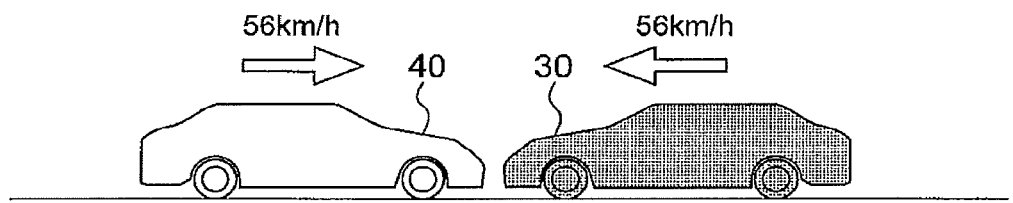
FIG. 5A is a drawing showing a state in which the own vehicle has decelerated further.
Figure 5B:
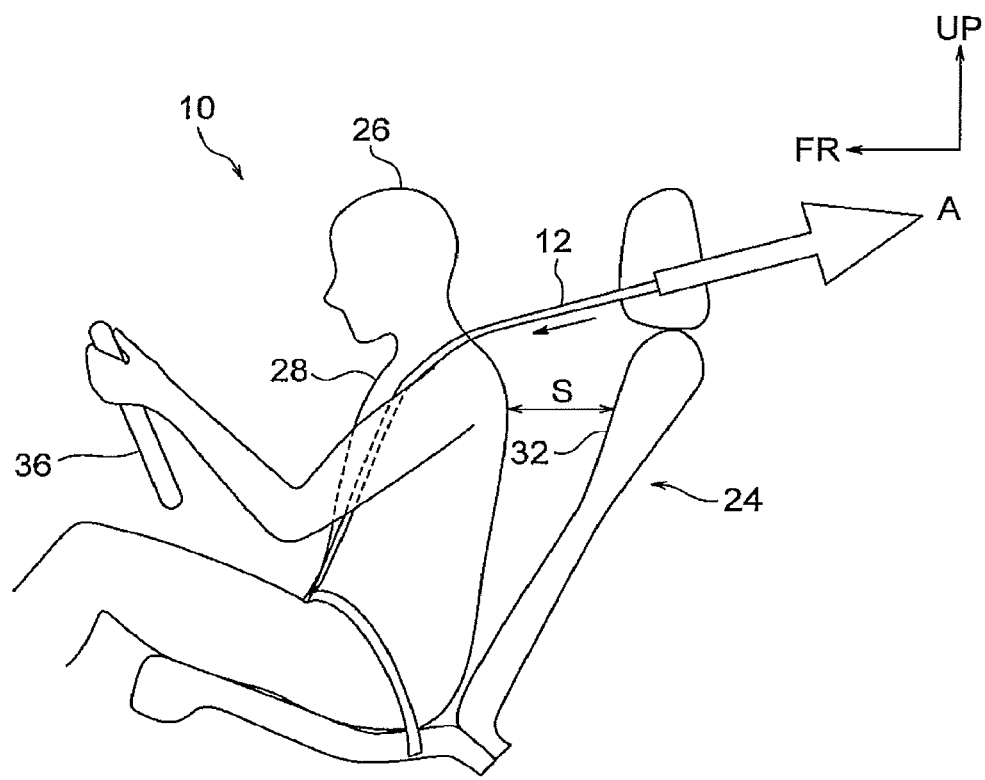
FIG. 5B is a side view showing a state in which the seatbelt is retracted and the vehicle occupant starts to move toward a vehicle rear side at the time of FIG. 5A.

FIG. 5A and FIG. 5B show a state in which the velocity of the own vehicle 30 has further decelerated to 56 km/h. At this time, due to operation of the explosive-type pretensioner 18 (FIG. 1), the seatbelt 12 is retracted, and the chest region 28 of the vehicle occupant 26 starts to move toward the vehicle rear side.

Figure 6A:
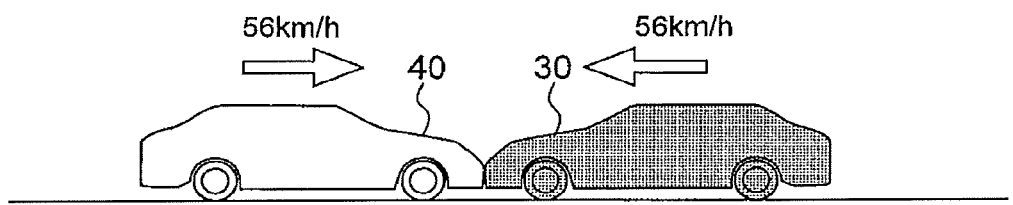
FIG. 6A is a drawing showing a state immediately before a front collision occurs between the own vehicle and the oncoming vehicle.
Figure 6B:
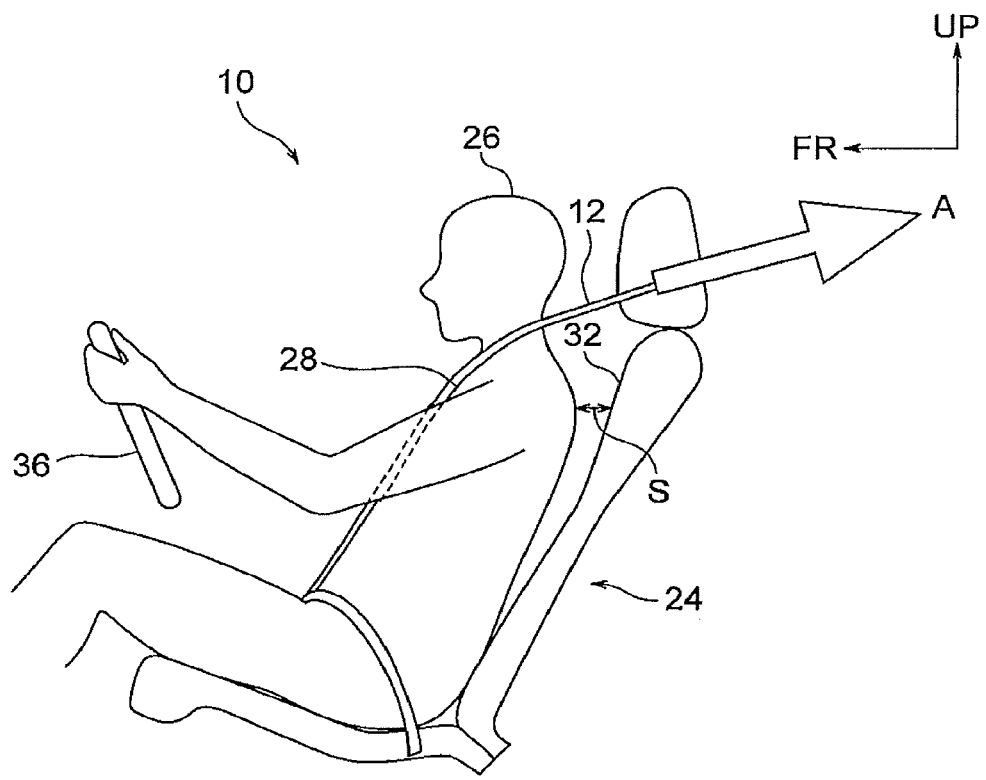
FIG. 6B is a side view showing a state in which movement of the vehicle occupant toward the vehicle rear side continues at the time of FIG. 6A.

FIG. 6A and FIG. 6B show a state immediately before a front collision between the own vehicle 30 and the oncoming vehicle 40 occurs. At this time, due to operation of the electric motor 20, the seatbelt 12 is retracted, and movement of the vehicle occupant 26 toward the vehicle rear side continues. Due thereto, the gap S between the vehicle occupant 26 and the seatback 32 decreases from the state shown in FIG. 5B.

Figure 7A:
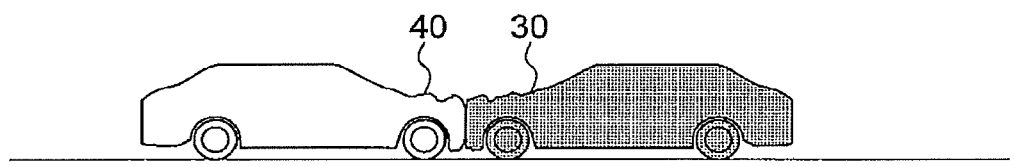
FIG. 7A is a drawing showing a state after a front collision has occurred.
Figure 7B:
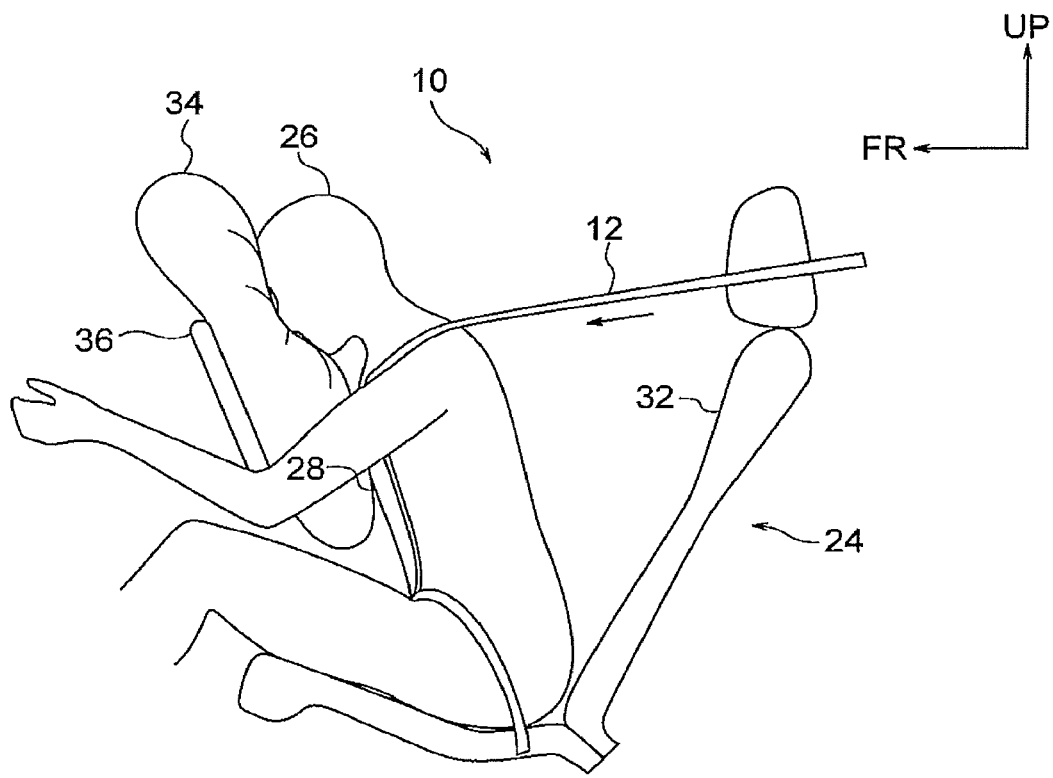
FIG. 7B is a side view showing a state in which the vehicle occupant has moved forward and is restrained by an airbag at the time of FIG. 7A.

FIG. 7A and FIG. 7B show a state after the front collision has occurred. FIG. 7B is a drawing showing a state in which, at this time, the vehicle occupant 26 has moved forward and is restrained by the airbag 34 that has expanded from the steering wheel 36 for example. At this time, due to a large tension arising at the seatbelt 12, the belt force limiter of the retractor operates, and pulling-out of the seatbelt 12 is permitted regardless of locking of the retractor and retracting by the electric motor 20.

FIG. 8 is a graph showing changes in the vehicle G (deceleration), changes in the seatbelt load, changes in the vehicle occupant velocity, and changes in the gap between the seatback and the vehicle occupant, during the time from the start of the automatic braking operation to forward movement of the vehicle occupant. In the drawing, the thick line indicates the Example, and the thin line indicates a Conventional Example that does not have the structure of the present exemplary embodiment. Further, in the drawing, interval (a) shows the stage from FIG. 3A and FIG. 3B to FIG. 4A and FIG. 4B. Interval (a) corresponds to a time that is from 1 s before to 25 ms before the start of the front collision. Interval (b) shows the stage from FIG. 4A and FIG. 4B to FIG. 5A and FIG. 5B, and corresponds to the time from the start till the end of retracting of the seatbelt by the explosive-type pretensioner 18 (FIG. 1) (25 ms before the start of the front collision). Interval (c) shows the stage of FIG. 6A and FIG. 6B, and corresponds to the time from the start of retracting of the seatbelt by the electric motor 20

(FIG. 1) until the start of forward movement of the vehicle occupant after the front collision occurs. The retracting of the seatbelt is carried out in intervals (b), (c) for example. Further, interval (d) shows the stage of FIG. 7A and FIG. 7B, and corresponds to the time after forward movement of the vehicle occupant starts (15 ms after the start of the front collision, and thereafter).

With regard to the vehicle G (deceleration), in interval (a), the vehicle G (deceleration) arises due to the start of the automatic braking operation. This vehicle G (deceleration) reaches 1G for example during interval (a). This deceleration of 1G is maintained until the start of the front collision. When the front collision occurs, the deceleration rises rapidly, and therefore, the velocity of the vehicle decreases rapidly.

With regard to the seatbelt load, in interval (b), the seatbelt load increases rapidly due to operation of the explosive-type pretensioner 18 (FIG. 1), and reaches the maximum F1, and thereafter, decreases to F2. Then, in interval (c), seatbelt load that is due to the electric motor 20 arises. The electric motor 20 continues to operate until forward movement of the vehicle occupant starts after the occurrence of the front collision, i.e., during interval (c), and the seatbelt load is maintained at F2. After forward movement of the vehicle occupant starts, accompanying the rapid rise in the deceleration of the vehicle, the seatbelt load also rises rapidly. Note that, as shown by the thin line, the seatbelt load in the Conventional Example does not increase until the start of forward movement of the vehicle occupant.

With regard to the vehicle occupant velocity, in intervals (b), (c), the vehicle occupant velocity decreases accompanying the retracting of the seatbelt, and, at the point in time when forward movement of the vehicle occupant starts after the occurrence of the front collision, the vehicle occupant velocity decelerates by 5 km/h for example. In this example, the vehicle occupant velocity decelerates to 51 km/h as compared with the velocity of the vehicle being 56 km/h at the time of the occurrence of the front collision. Due to this deceleration of 5 km/h, the kinetic energy of the vehicle occupant is reduced. Note that, as shown by the thin line, in the Conventional Example, braking of the vehicle by the automatic brake and retracting of the seatbelt are not carried out. Therefore, the vehicle occupant velocity coincides with the velocity of the vehicle, and does not decrease until the start of forward movement of the vehicle occupant after the start of the front collision.

With regard to the gap between the seatback and the vehicle occupant, in interval (a), the gap increases due to the automatic braking operation. In intervals (b), (c), the gap decreases due to movement of the vehicle occupant toward the vehicle rear side that is due to retracting of the seatbelt, but the gap does not become 0. Namely, in these intervals (b), (c), the vehicle occupant continues to move toward the vehicle rear side without contacting the seatback 32 (FIG. 1). In interval (d), the gap switches to increasing due to the start of forward movement of the vehicle occupant. Note that, as shown by the thin line, the gap between the seatback and the vehicle occupant in the Conventional Example does not change until the start of the front collision, because braking of the vehicle by automatic braking does not occur. Namely, until the start of the front collision, the vehicle occupant is in a state of contacting the seatback. This gap increases from the time of the start of the front collision.

Figure 9:
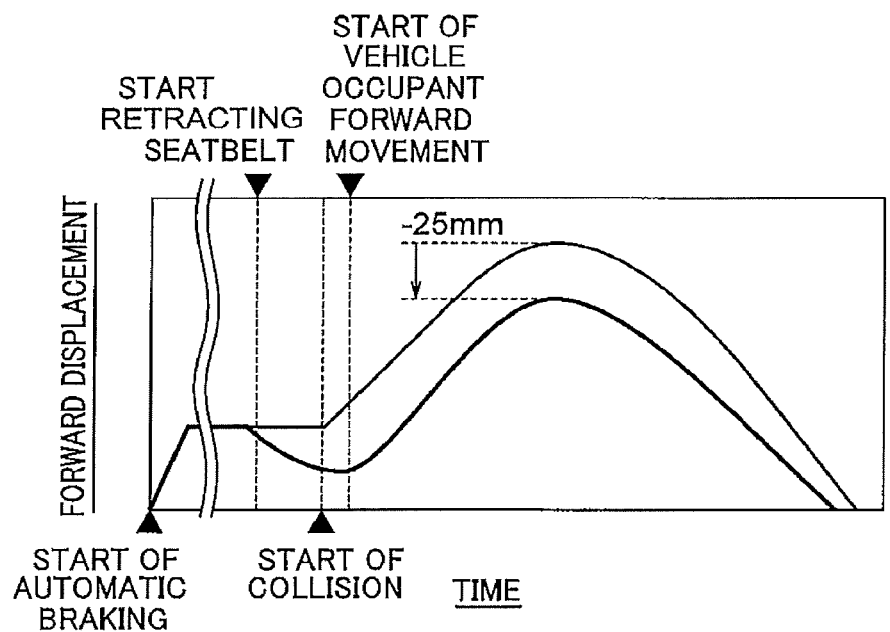
FIG. 9 is a graph showing changes in the forward movement of the vehicle occupant, during the time from the start of the automatic braking operation until after a front collision has occurred.

FIG. 9 is a graph showing changes in the forward movement of the vehicle occupant, during the time from the start of the automatic braking operation until after the front collision has occurred. Due to the starting of the automatic braking operation, the chest region 28 (FIG. 1) of the vehicle occupant moves toward the vehicle front side due to inertia. When retracting of the seatbelt is started, until the start of forward movement of the vehicle occupant after the occurrence of the front collision, the vehicle occupant continues to move toward the vehicle rear side while receiving the seatbelt load. After the start of forward movement, the vehicle occupant moves toward the vehicle front side until restrained by the seatbelt 12 and the airbag 34 (FIG. 7B). Comparing the Example that is shown by the thick line and the Conventional Example that is shown by the thin line, the maximum value of the movement toward the front of the vehicle in the Example is 25 mm less than the maximum value of the movement toward the front of the vehicle in the Conventional Example. From this, it can be understood that the energy that is to be absorbed at the time of restraining the vehicle occupant is decreased.

Figure 10:
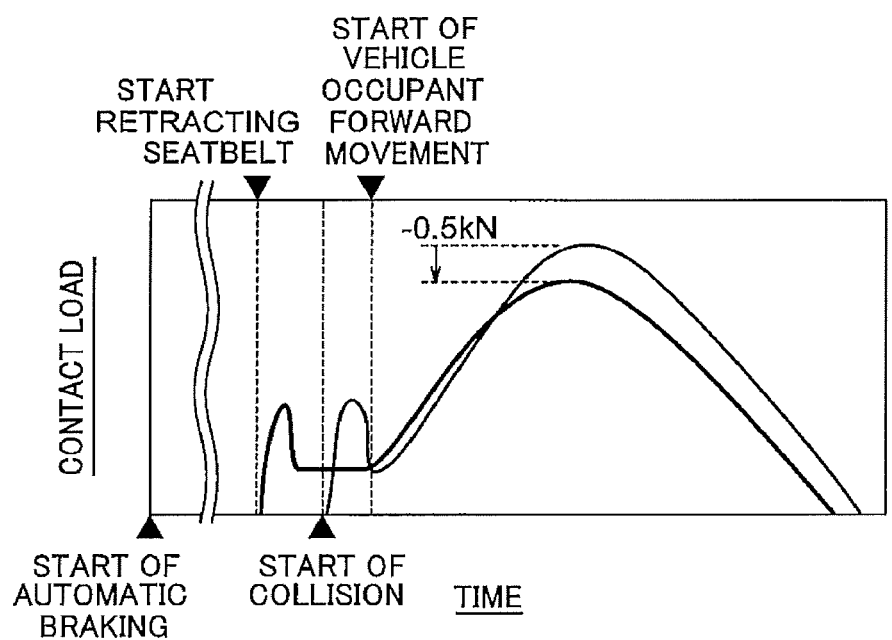
FIG. 10 is a graph showing changes in contact load with respect to the seatbelt and the airbag, during the time from the start of the automatic braking operation until after a front collision has occurred.

FIG. 10 is a graph showing changes in contact load with respect to the seatbelt and the airbag, during the time from the start of the automatic braking operation until after the front collision has occurred. The changes in the contact load until forward movement of the vehicle occupant starts after a front collision has occurred correspond to the changes in the seatbelt load that are shown in FIG. 8. After the start of forward movement of the vehicle occupant, when the vehicle occupant receives the restraining of the airbag, the contact load with the airbag is added to the contact load with the seatbelt. Comparing the Example that is shown by the thick line and the Conventional Example that is shown by the thin line, the maximum value of the contact load in the Example is 0.5 kN less than the maximum value of the contact load in the Conventional Example. From this as well, it can be understood that the energy that is to be absorbed at the time of restraining the vehicle occupant is decreased.

Figure 11:
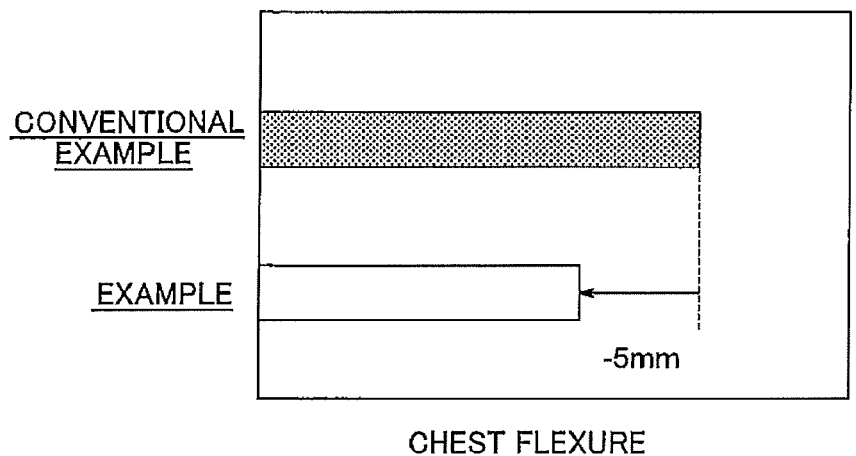
FIG. 11 is a graph comparing a Conventional Example and an Example with regard to flexure of a chest region of the vehicle occupant (chest flexure)

FIG. 11 is a graph comparing the Conventional Example and the Example with regard to flexure of the chest region of the vehicle occupant (chest flexure). Chest flexure is an index of the vehicle occupant protecting performance, and, the smaller the value, the better the performance. In the Example, the chest flexure is 5 mm lower than in the Conventional Example.

Figure 12:
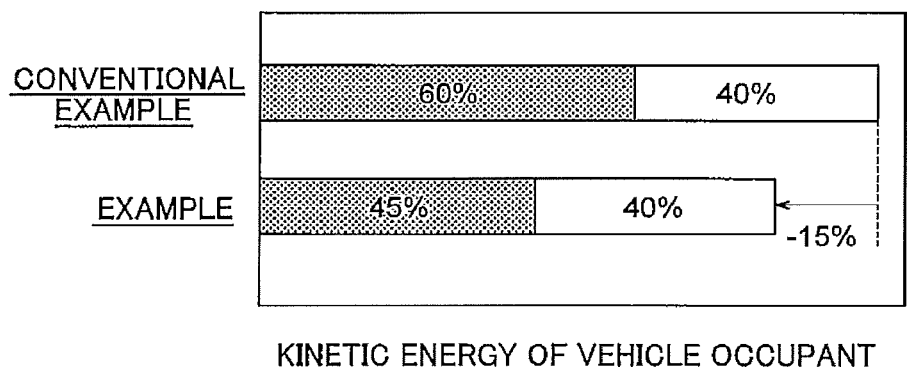
FIG. 12 is a drawing comparing the Conventional Example and the Example with regard to kinetic energy of the vehicle occupant.

FIG. 12 is a drawing comparing the Conventional Example and the Example with regard to kinetic energy of the vehicle occupant. The white portion is the energy that the vehicle absorbs, and the shaded portion is the energy that the restraining devices, such as the seatbelt and the airbag and the like, absorb. In the Example, the energy that the restraining devices absorb is reduced by 15% as compared with the Conventional Example. This is not only due to the vehicle occupant being decelerated by the automatic braking before the occurrence of the front collision, but is also due to the vehicle occupant being further decelerated and the initial kinetic energy being reduced due to the retracting of the seatbelt. In the Example, the energy that the vehicle absorbs is maintained in the same way as in the Conventional Example.

Although an example of an exemplary embodiment of the present disclosure has been described above, embodiments of the present disclosure are not limited to the above, and, other than the above, can of course be implemented by being modified in various ways within a scope that does not depart from the gist of the present disclosure.

Figure 13:
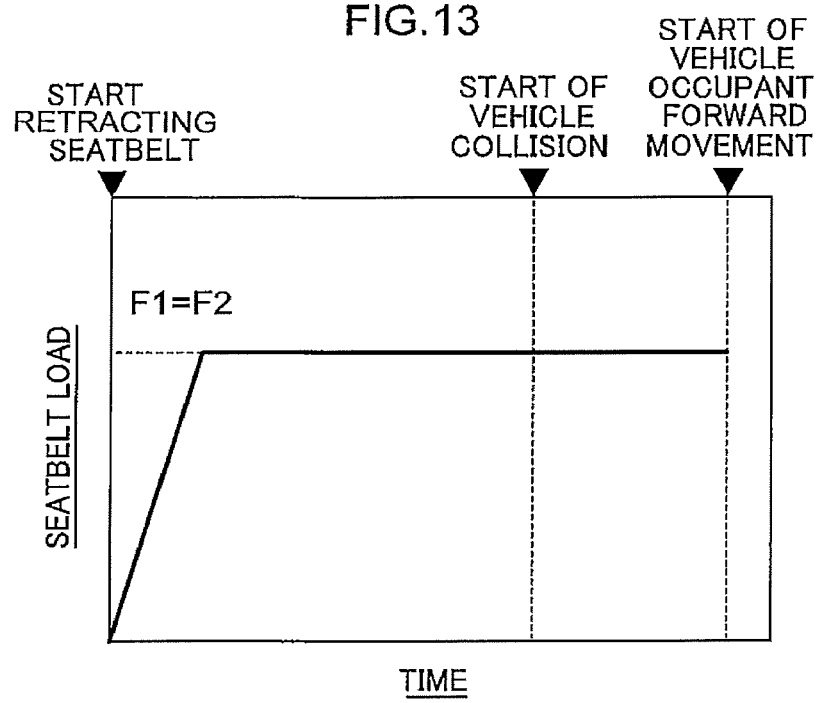
FIG. 13 is a graph showing changes in the seatbelt load during the time from the start of retracting of the seatbelt to the start of forward movement of the vehicle occupant, in a case in which only an electric motor is used as an actuator.

For example, the actuator may be the electric motor 20 (FIG. 1) only. FIG. 13 is a graph showing an example of changes in the seatbelt load during the time from the start of retracting of the seatbelt to the start of forward movement of the vehicle occupant, in a case in which only the electric motor 20 is used. As compared with FIG. 2 in which the explosive-type pretensioner 18 also is used, because there is no retracting by the explosive-type pretensioner 18, F1 that is the maximum value of the seatbelt load is the same value as the load F2 that is due to the electric motor 20. When the electric motor 20 starts to operate, the seatbelt load increases and reaches F2. Thereafter, the seatbelt load is maintained at F2 at least until the start of forward movement of the vehicle occupant.

Figure 14:
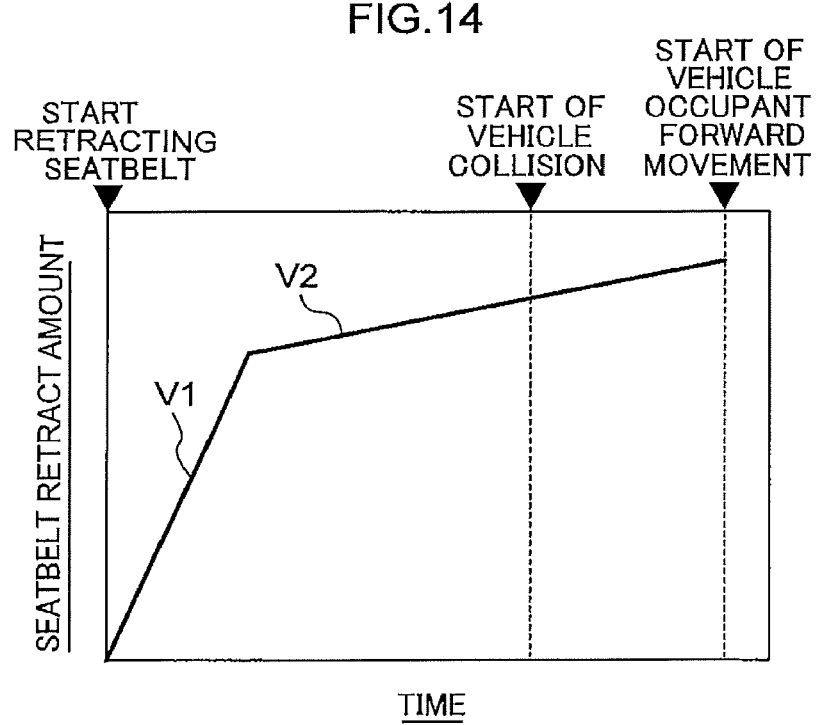
FIG. 14 is a graph showing control of a seatbelt retract amount for realizing the changes in the seatbelt load of FIG. 13.

In order to obtain the change characteristic of such a seatbelt load, as shown in FIG. 14 for example, it is thought to control the seatbelt retract amount. In this case, the electric motor 20 is driven at a first velocity V1 by the control section 22 (FIG. 1) before the occurrence of a front collision of the vehicle, and concretely, in the initial stage in which retracting of the seatbelt 12 starts. Thereafter, the electric motor 20 is driven at second velocity V2 that is slower than the first velocity V1, from before the occurrence of the front collision at least until the forward movement of the vehicle occupant 26 starts.

In the initial stage of retracting of the seatbelt 12 before the occurrence of a front collision of the vehicle, first, the electric motor 20 is driven at the relatively fast first velocity V1, and the seatbelt 12 is retracted. Due thereto, the seatbelt retract amount per unit time is made to be large. Due thereto, deceleration of the vehicle occupant 26 before the front collision can be made to be large. Further, thereafter, from before the occurrence of the front collision at least until forward movement of the vehicle occupant 26 starts after the front collision occurs, the electric motor 20 is driven at the relatively slow second velocity V2, and the seatbelt 12 is retracted. Due thereto, the seatbelt retract amount per unit time is made to be small.

Due thereto, the vehicle occupant 26 can be continued to be moved toward the vehicle rear side, while an increase in the seatbelt load that is applied to the vehicle occupant 26 is suppressed. When forward movement of the vehicle occupant 26 starts after the occurrence of a front collision, the vehicle occupant 26 is already being restrained by the seatbelt 12, and therefore, an increase in the kinetic energy at the time of forward movement of the vehicle occupant 26 may be suppressed. In a case in which only the electric motor 20 is used as the actuator, the electric motor 20 may be used repeatedly, and therefore, there is no need to replace parts when a collision is avoided.

Note that the retract amount of the seatbelt 12 may be monitored by using a take-up amount sensor (not illustrated) of the retractor, and, when the retract amount reaches a predetermined amount, the driving speed of the electric motor 20 may be switched from the first velocity V1 to the second velocity V2. The driving velocity can be adjusted by the electric power that is supplied to the electric motor 20.

The actuator may be the explosive-type pretensioner 18 (FIG. 1) only. By changing what is plotted on the vertical axis in FIG. 14 to energy of the explosive of the explosive-type pretensioner 18 and controlling the energy in a stepwise manner, until forward displacement of the vehicle occupant 26 starts after a front collision, seatbelt load continues to be inputted from the seatbelt 12 to the vehicle occupant 26, and the vehicle occupant 26 can be continued to be moved toward the vehicle rear side.

Figure 15:
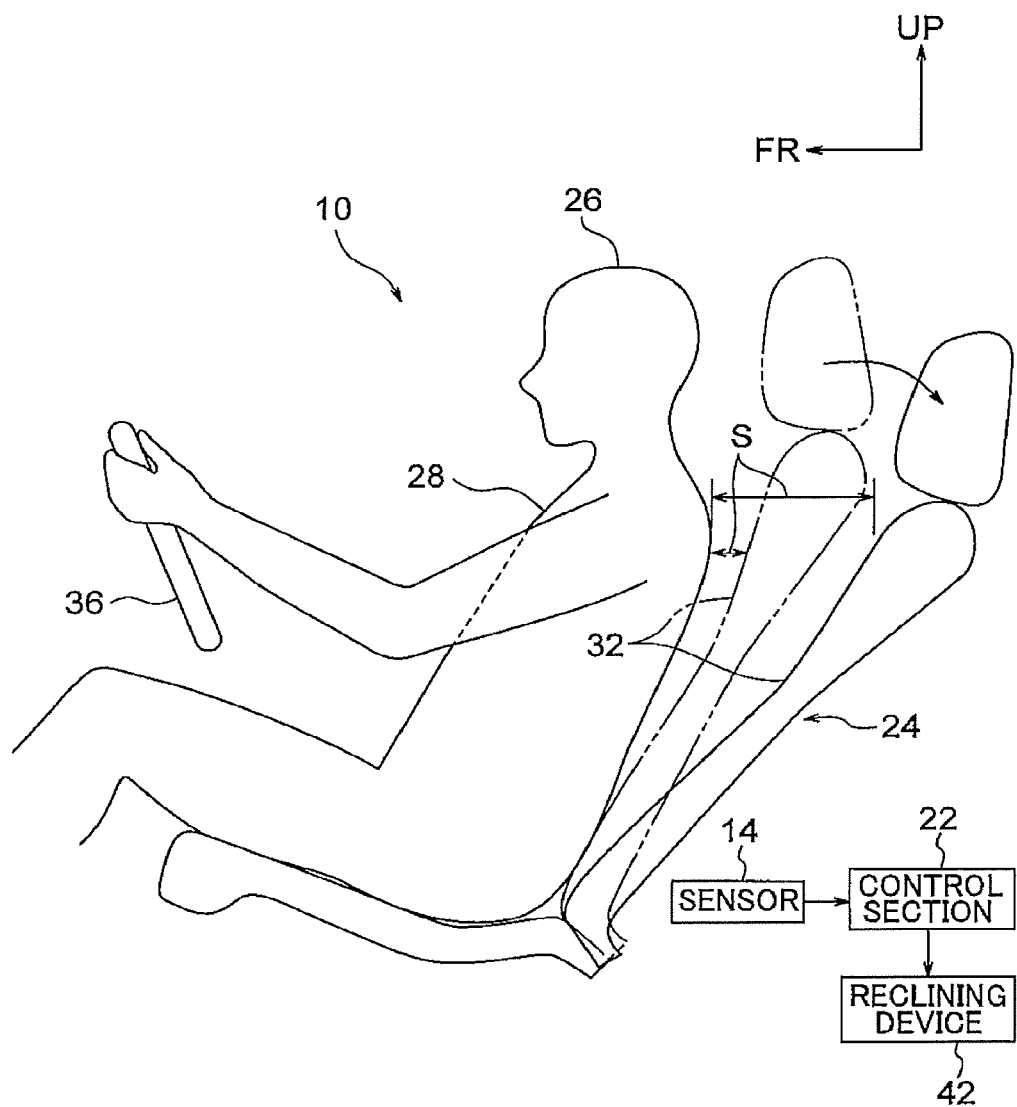
FIG. 15 is a side view and a block drawing showing an example in which a reclining device is used as a gap enlarging section.
Figure 16:
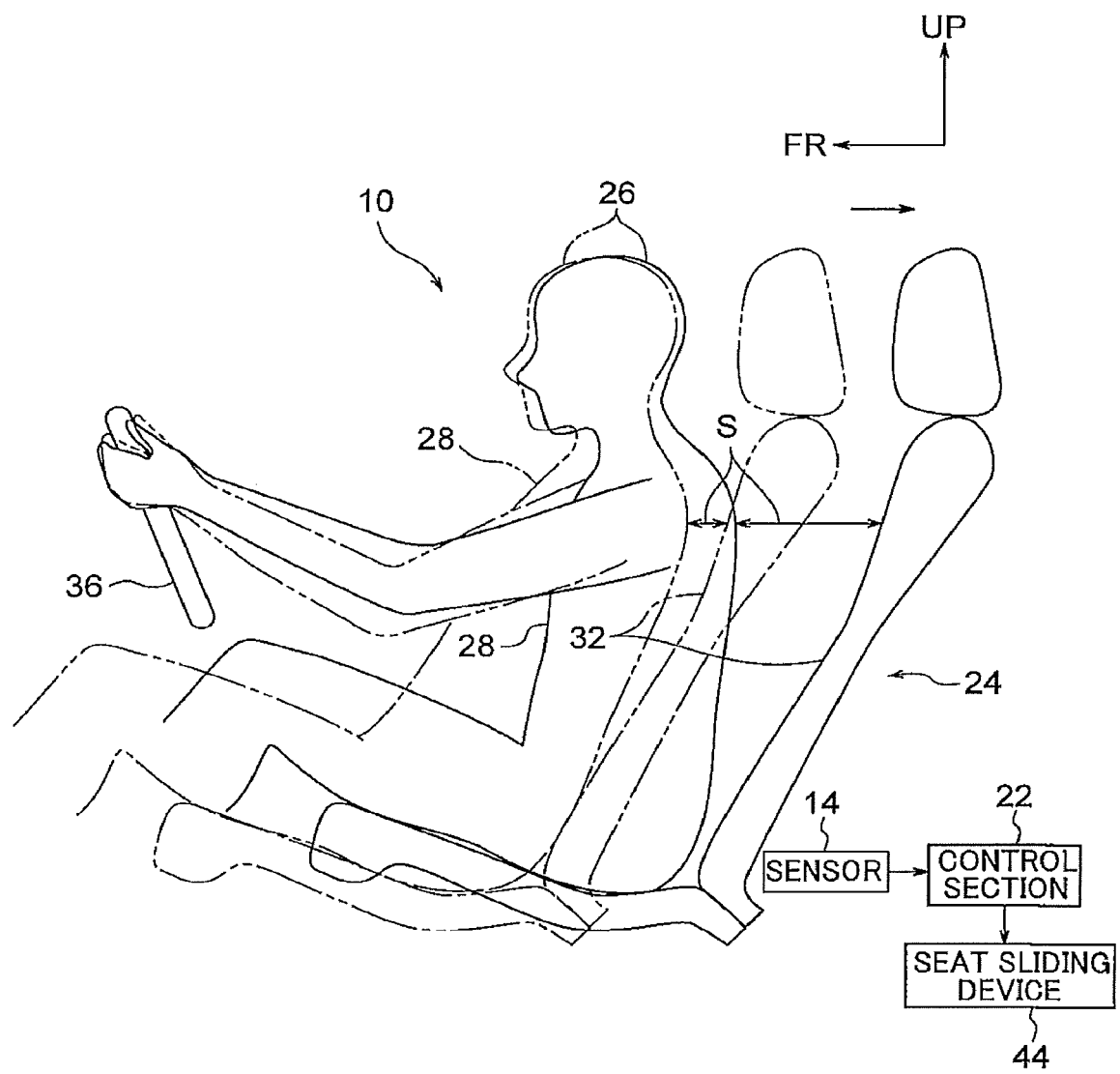
FIG. 16 is a side view and a block drawing showing an example in which a seat sliding device is used as the gap enlarging section.

The gap enlarging section is not limited to the braking device 16, and may be a reclining device 42 (FIG. 15) that tilts the seatback 32 rearward, or may be a seat sliding device 44 (FIG. 16) that moves the vehicle seat 24 toward the vehicle rear side, or the like. The reclining device 42 or the seat sliding device 44 operates from before a front collision at least until (at the latest until) forward movement of the vehicle occupant 26 starts after the occurrence of the front collision. In FIG. 15 and FIG. 16, the vehicle occupant 26 is wearing a seatbelt (not illustrated). Operation may be completed before the front collision, or operation may be continued until the forward movement of the vehicle occupant 26 starts.

The gap S between the vehicle occupant 26 and the seatback 32 can be enlarged by tilting the seatback 32 rearward or by moving the vehicle seat 24 toward the vehicle rear side, until forward movement of the vehicle occupant 26 starts after the occurrence of a front collision of the vehicle. By using various types of gap enlarging sections in this way, the region over which the chest region 28 of the vehicle occupant 26 can move toward the vehicle rear side can be enlarged. Further, due thereto, the decelerated state of the vehicle occupant 26 due to the retracting of the seatbelt 12 can be maintained up until the initial stage of the collision in which forward movement of the vehicle occupant 26 starts after the front collision has occurred.

Note that the braking device 16, the reclining device 42 and the seat sliding device 44 may be used in combination appropriately.

What is claimed is:

1. An occupant restraining device for a vehicle comprising:
   a seatbelt structured so as to be able to be retracted at the vehicle, and positioned at a chest region of a vehicle occupant when seated in a vehicle seat;
   a collision predicting sensor configured to sense, in advance, a front collision of the vehicle;
   a gap enlarging section configured to enlarge a gap between the vehicle occupant and a seatback of the vehicle seat;
   an actuator configured to retract the seatbelt; and
   a control section configured to, in a case in which a front collision of the vehicle is sensed in advance by the collision predicting sensor,
      enlarge the gap between the vehicle occupant and the seatback by the gap enlarging section,
      start retracting of the seatbelt by the actuator to reduce the gap between the vehicle occupant and the seatback at a first rate of reduction, and
      after retracting of the seatbelt has started and from before the front collision at least until forward movement of the vehicle occupant starts after occurrence of the front collision, continue to input load from the seatbelt to the vehicle occupant and continue to move the vehicle occupant toward a vehicle rear side to reduce the gap between the vehicle occupant and the seatback at a second rate of reduction, wherein the first rate of reduction is greater than the second rate of reduction.

2. The occupant restraining device for a vehicle of claim 1, wherein:
   the actuator includes an explosive-type pretensioner and an electric motor; and
   the control section operates the explosive-type pretensioner before a front collision of the vehicle, and, from before the front collision at least until forward movement of the vehicle occupant starts, drives the electric motor.

3. The occupant restraining device for a vehicle of claim 2, wherein the load is set to become a maximum at a time of operation of the explosive-type pretensioner.

4. The occupant restraining device for a vehicle of claim 1, wherein:
the actuator is an electric motor; and
before a front collision of the vehicle occurs, the control section drives the electric motor at a first velocity, and, thereafter, from before the front collision occurs at least until forward movement of the vehicle occupant starts, drives the electric motor at a second velocity that is slower than the first velocity.

5. The occupant restraining device for a vehicle of claim 1, wherein the gap enlarging section is at least one of a braking device that decelerates the vehicle and tilts the vehicle occupant forward by inertia, a reclining device that tilts the seatback rearward, or a seat sliding device that moves the vehicle seat toward the vehicle rear side.

6. The occupant restraining device for a vehicle of claim 1, wherein the seatbelt is pulled out by a retractor when the gap enlarging section enlarges the gap between the vehicle occupant and the seatback and after the occurrence of the front collision.

* * * * *